United States Patent
Yadav et al.

(10) Patent No.: US 11,281,546 B2
(45) Date of Patent: Mar. 22, 2022

(54) SYSTEM AND METHOD FOR PERFORMING AN INCREMENTAL BACKUP FOR A PERSISTENT STORAGE SYSTEM THAT STORES DATA FOR A NODE CLUSTER

(71) Applicant: EMC IP Holding Company LLC, Hopkinton, MA (US)

(72) Inventors: Sunil Yadav, Bangalore (IN); Manish Sharma, Bangalore (IN); Aaditya Rakesh Bansal, Bangalore (IN); Shelesh Chopra, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 44 days.

(21) Appl. No.: 16/886,522

(22) Filed: May 28, 2020

(65) Prior Publication Data
US 2021/0182153 A1    Jun. 17, 2021

(30) Foreign Application Priority Data
Dec. 16, 2019 (IN) .............................. 201941052138

(51) Int. Cl.
| | |
|---|---|
| *G06F 11/00* | (2006.01) |
| *G06F 11/14* | (2006.01) |
| *G06F 16/13* | (2019.01) |
| *G06F 11/07* | (2006.01) |
| *G06F 11/16* | (2006.01) |
| *G06F 11/20* | (2006.01) |
| *G06F 3/06* | (2006.01) |
| *G06F 11/36* | (2006.01) |

(52) U.S. Cl.
CPC .......... *G06F 11/1469* (2013.01); *G06F 3/067* (2013.01); *G06F 3/0619* (2013.01); *G06F 3/0644* (2013.01); *G06F 11/0772* (2013.01); *G06F 11/1448* (2013.01); *G06F 11/1451* (2013.01); *G06F 11/1461* (2013.01); *G06F 11/1464* (2013.01); *G06F 11/1658* (2013.01); *G06F 11/2023* (2013.01); *G06F 11/3604* (2013.01); *G06F 16/137* (2019.01); *G06F 2201/835* (2013.01)

(58) Field of Classification Search
CPC ............ G06F 11/1448; G06F 11/1451; G06F 11/1458; G06F 11/1461; G06F 11/1464; G06F 11/1471; G06F 11/1658; G06F 11/2023
See application file for complete search history.

(56) References Cited

U.S. PATENT DOCUMENTS

| | | | |
|---|---|---|---|
| 8,676,759 B1 | 3/2014 | Zhu et al. | |
| 8,909,980 B1 * | 12/2014 | Lewis ................. | G06F 11/1658 714/5.11 |

(Continued)

*Primary Examiner* — Marc Duncan
(74) *Attorney, Agent, or Firm* — Chamberlain, Hrdlicka, White, Williams & Aughtry

(57) ABSTRACT

A method for managing a persistent storage system includes obtaining, by a first node in a node cluster, a write request, wherein the node cluster comprises the first node and a second node, processing the write request, storing data associated with the write request in a persistent storage system, updating a block-based change list based on the storing, making a first determination that a synchronization schedule is triggered, and in response to the first determination: initiating a block-based change list synchronization to the second node.

17 Claims, 9 Drawing Sheets

(56) References Cited

U.S. PATENT DOCUMENTS

| | | |
|---|---|---|
| 9,003,143 B1 | 4/2015 | Barnes et al. |
| 10,567,500 B1 * | 2/2020 | Leshinsky ............ H04L 67/1076 |
| 11,132,331 B2 | 9/2021 | Singh et al. |
| 2008/0244204 A1 | 10/2008 | Cremelie |
| 2013/0110783 A1 | 5/2013 | Wertheimer et al. |
| 2017/0177867 A1 | 6/2017 | Crofton |
| 2018/0285199 A1 | 10/2018 | Mitkar et al. |
| 2020/0104202 A1 * | 4/2020 | Stupak .................. G06F 11/203 |
| 2020/0125449 A1 * | 4/2020 | Mao .................... G06F 11/1456 |
| 2021/0149769 A1 | 5/2021 | Balcha et al. |
| 2021/0149772 A1 | 5/2021 | Zatsepin et al. |

* cited by examiner

SYSTEM AND METHOD FOR PERFORMING AN INCREMENTAL BACKUP FOR A PERSISTENT STORAGE SYSTEM THAT STORES DATA FOR A NODE CLUSTER

CROSS-REFERENCE TO RELATED APPLICATION

This application claims priority to Indian Patent Application No. 201941052138, filed Dec. 16, 2019, which incorporated by reference herein in its entirety.

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a first node in a node cluster, a write request, wherein the node cluster comprises the first node and a second node, processing the write request, storing data associated with the write request in a persistent storage system, updating a block-based change list based on the storing, making a first determination that a synchronization schedule is triggered, and in response to the first determination: initiating a block-based change list synchronization to the second node.

In general, in one aspect, the invention relates to a system that includes a processor and memory that includes instructions which, when executed by the processor, perform a method. The method includes obtaining, by a first node in a node cluster, a write request, wherein the node cluster comprises the first node and a second node, processing the write request, storing data associated with the write request in a persistent storage system, updating a block-based change list based on the storing, making a first determination that a synchronization schedule is triggered, and in response to the first determination: initiating a block-based change list synchronization to the second node.

In general, in one aspect, the invention relates to a non-transitory computer readable medium that includes computer readable program code, which when executed by a computer processor enables the computer processor to perform a method for performing backup operations. The method includes obtaining, by a first node in a node cluster, a write request, wherein the node cluster comprises the first node and a second node, processing the write request, storing data associated with the write request in a persistent storage system, updating a block-based change list based on the storing, making a first determination that a synchronization schedule is triggered, and in response to the first determination: initiating a block-based change list synchronization to the second node.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to systems and methods for generating incremental backups of a shared persistent storage system in a node cluster. The shared persistent storage system may store data from multiple nodes. Each node may locally store a block-based change list that tracks the changes made to sections of the persistent storage system by the node or by other nodes in the node cluster. The block-based change list may be synchronized with the other nodes in the node cluster such that, when an incremental backup of the persistent storage system is initiated, the backup agent performing such backup may utilize the block-based change list to determine which portions of the persistent storage system to back up.

Figure 1:
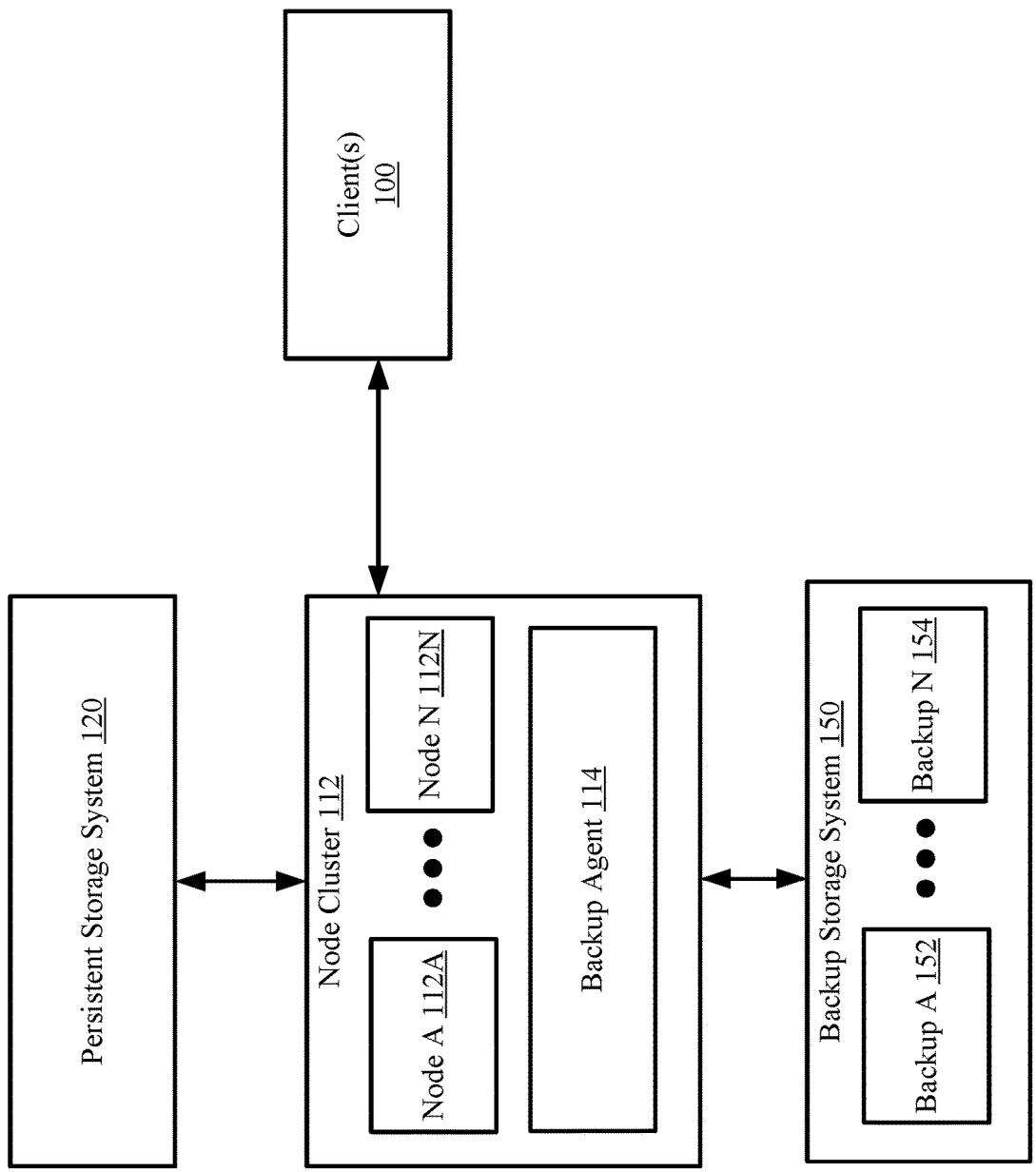
FIG. 1 shows a diagram of a system in accordance with one or more embodiments of the invention.

FIG. 1 shows a diagram of a system in accordance with one or more embodiments of the invention. The system may include one or more clients (100), a node cluster (112), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the node cluster (112) is a collection of physical and/or logical entities that execute applications (not shown) using computing resources of one or more computing devices. Each node (112A, 112N) in the node cluster (112) may be performing similar or different processes. In one or more embodiments of the invention, each node (112A, 112N) provides services to users, e.g., clients (100). For example, a node (112A, 112N) may host applications. The applications may be, for example, instances of databases, email servers, and/or other applications. The nodes (112A, 112N) may host other types of applications without departing from the invention.

In one or more embodiments of the invention, one node (e.g., 112A, 112N) in the node cluster (112) may serve as the primary node. The primary node in the node cluster (112) may include functionality for writing data to the persistent storage system (120) and tracking the changes to the persistent storage system (120) as the data is written to the persistent storage device. The primary node may further send the tracked changes to the other nodes in the node cluster (112). The primary node may perform the aforementioned functionality in accordance with FIG. 3A.

In one or more embodiments of the invention, a node (112A, 112N) in the node cluster that is not a primary node may include functionality for assuming the role of primary node based on a notification that the current primary node experiences a failover. In one or more embodiments of the invention, the primary node may experience a failover based on, for example, an unexpected reboot of the primary node, a failure by the primary node to connect to the persistent storage system (120), a failure by the primary node to connect to the clients (100), an unexpected shutdown by the primary node, and/or a failure by the primary node to execute an application. The failover may occur via other factors without departing from the invention. The process of the node (e.g., 112A, 112N) assuming the role of the primary node may be performed in accordance with the method illustrated in FIG. 3B. The aforementioned process may be performed via other methods without departing from the invention.

Figure 5:
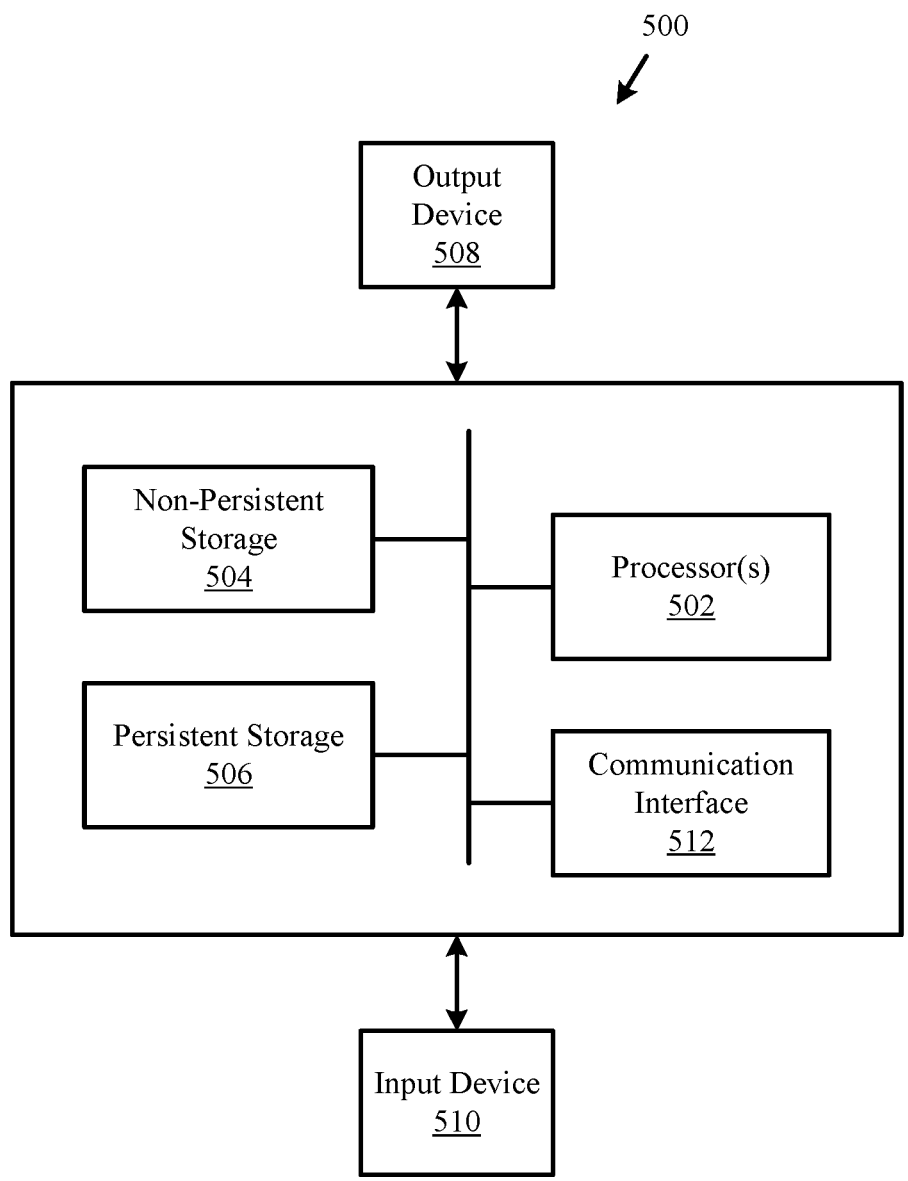
FIG. 5 shows a diagram of a computing device in accordance with one or more embodiments of the invention.

In one or more embodiments of the invention, each node (112A, 112N) in the node cluster (112) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the node (112A, 112N) described throughout this application and/or all, or a portion thereof, of the methods illustrated in FIGS. 3A-3B.

In one or more embodiments of the invention, each node (112A, 112N) in the node cluster (112) is implemented as a logical device. The logical device may utilize the computing resources of any number of computing devices and thereby provide the functionality of the node (112A, 112N) described throughout this application and/or all, or a portion thereof, of the methods illustrated in FIGS. 3A-3B.

In one or more embodiments of the invention, the system further includes a persistent storage system (120). In one or more embodiments of the invention, the persistent storage system (120) stores data written by the nodes (112A, 112N) in the node cluster (112). The data may be data obtained from other components without departing from the invention.

In one or more embodiments of the invention, the persistent storage system (120) includes any number of persistent storage devices that, collectively, store the data as written by the nodes (112A, 112N) in the node cluster.

The persistent storage devices may be (or include) non-volatile storage. In other words, the data stored in the persistent storage devices does not get lost or removed when the persistent storage devices lose power. Each of the persistent storage devices may be (or include), for example, solid state drives, hard disk drives, and/or tape drives. The persistent storage devices may include other types of non-volatile or non-transitory storage mediums without departing from the invention.

Each persistent storage device (not shown) may be further divided into any number of portions that may be tracked when new data is written to such portions. The portions may be divided based on the type of persistent storage device. For example, a persistent storage device may be a hard disk drive. Each portion of a hard disk drive may be a sector or a disk section. Each sector may be tracked by the nodes (112A, 112N) in the node cluster (112) whenever new data is written to the sectors. The hard disk drive may be divided into other portions without departing from the invention.

In one or more embodiments of the invention, the persistent storage system (120) is implemented as a logical device. The logical device may utilize the computing resources of any number of computing devices (or persistent storage devices (e.g., disk drives, solid state drives, etc.)) and thereby provide the functionality of the persistent storage system (120) described throughout this application.

In one or more embodiments of the invention, the node cluster (112) further includes a backup agent (114). The backup agent may include functionality for generating backups of the persistent storage system (120). Each backup (152, 154) may include all, or a portion thereof, of the data in the persistent storage system (120) at a specified point in time.

In one or more embodiments of the invention, the backup agent (114) may generate the backups based on backup policies implemented by the backup agent (114). The backup policies may specify a schedule in which the persistent storage system (120) is to be backed up. The backup agent (114) may be triggered to execute a backup in response to a backup policy. The backup agent may perform the incremental backup via the method illustrated in FIG. 3C. The backup agent may perform the incremental backup via any other method without departing from the invention.

In one or more embodiments of the invention, the backup agent (114) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (114) described throughout this application.

In one or more of embodiments of the invention, the backup agent (114) is implemented as computer instructions, e.g., computer code, stored on a persistent storage that when executed by a processor of a computing device causes the computing device to provide the functionality of the backup agent (114) described throughout this application. The backup agent may be internal to one or more nodes (112A, 112N) or external to all nodes (112A, 112N) in the node cluster without departing from the invention.

In one or more embodiments of the invention, the client(s) (100) utilize services provided by the node cluster (112). Specifically, the client(s) (100) may utilize the applications in the nodes (112A, 112N) to obtain, modify, and/or store data. The data may be generated from applications hosted in the node cluster (112).

In one or more embodiments of the invention, a client (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) stores backups of the persistent storage system (120) associated with the application containers. In one or more embodiments of the invention, a backup is a full or partial copy of data stored in the persistent storage system (120) at a specified point in time.

In one or more embodiments of the invention, a backup (152, 154) in the backup storage system (150) is an incremental backup. In one or more embodiments of the invention, an incremental backup is a backup that only stores changes in the persistent storage system (120) that were made after a previous backup in the backup storage system. In contrast, a full backup may include all of the data in the persistent storage system (120) without taking into account when the data had been modified or otherwise written to the persistent storage system (120).

In one or more embodiments of the invention, if the data in the persistent storage system is to be restored to a point in time associated with an incremental backup, the required backups needed to perform the restoration include at least: (i) the incremental backup, (ii) a full backup, and (iii) the intermediate backups (if any) that are associated with points in time between the full backup and the incremental backups. In this manner, the required backups collectively include all of the data of the persistent storage system (120) at the requested point in time.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
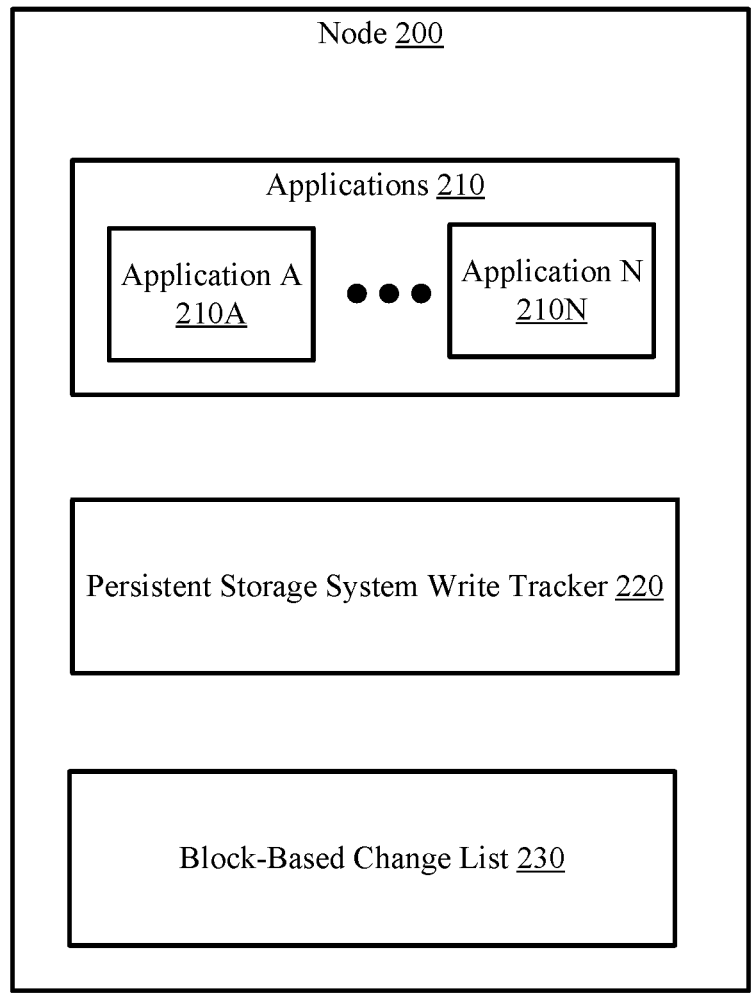
FIG. 2 shows a diagram of a node in accordance with one or more embodiments of the invention.

FIG. 2 shows a diagram of a node in accordance with one or more embodiments of the invention. The node (200) may be an embodiment of a node (112A, 112N) discussed above. In one or more embodiments of the invention, the node (200) includes one or more applications (210), a persistent storage system write tracker (220), and a block-based change list (230). The node (200) may include additional, fewer, and/or different components without departing from the invention. Each of the aforementioned components illustrated in FIG. 2 is discussed below.

In one or more embodiments of the invention, the applications (210) perform services for clients (e.g., 100, FIG. 1). The services may include writing, reading, and/or otherwise modifying data that is stored in the persistent storage system (e.g., 114, FIG. 1). The applications (210) may each include functionality for writing data to the persistent storage system and for notifying the persistent storage system write tracker (discussed below) of data written to the persistent storage system.

In one or more embodiments of the invention, the persistent storage system write tracker (220) tracks the changed portions of the persistent storage system. The persistent storage system write tracker (220) tracks such changed portions by maintaining a block-based change list (230). The persistent storage system write tracker (220) may communicate with the applications (e.g., application A (210A), application N (210N)) to obtain information about which portions of the persistent storage system have had data written to since the last backup was performed.

In one or more embodiments of the invention, the persistent storage system write tracker (220) further includes functionality for providing the block-based change list (230), or a copy thereof, to another node and/or to the backup agent. In one or more embodiments of the invention, the persistent storage system write tracker (220) may provide the block-based change list (230), or a copy thereof, to another node in accordance with a synchronization schedule. In one or more embodiments of the invention, a synchronization schedule is a schedule followed by the persistent storage system write tracker (220) (or another component of the node (200)) that specifies when to initiate a synchronization of the block-based change list (230) with the other nodes in the node cluster. If a synchronization schedule is triggered, the persistent storage system write tracker (220) performing the synchronization may send a copy of the block-based change list (230) to each node in the node cluster. Other components of the node (200) (either illustrated in FIG. 2 or not shown) may perform the aforementioned functionality without departing from the invention.

In one or more embodiments of the invention, the persistent storage system write tracker (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the persistent storage system write tracker (220) described throughout this application.

In one or more embodiments of the invention, the persistent storage system write tracker (220) is implemented as computer instructions, e.g., computer code, stored on a persistent storage that when executed by a processor of the node (200) causes the node (200) to provide the functionality of the persistent storage system write tracker (220) described throughout this application.

In one or more embodiments of the invention, the block-based change list (230) is a data structure that specifies one or more portions of a persistent storage system that have been modified after a most recent backup of the persistent storage system. The block-based change list (230) may be reset after a backup has been generated. In this manner, the block-based change list (230) does not specify modified portions from before a most recent backup. The block-based change list (230) may be stored in memory, cache, or stored persistently without departing from the invention.

Figure 3A:
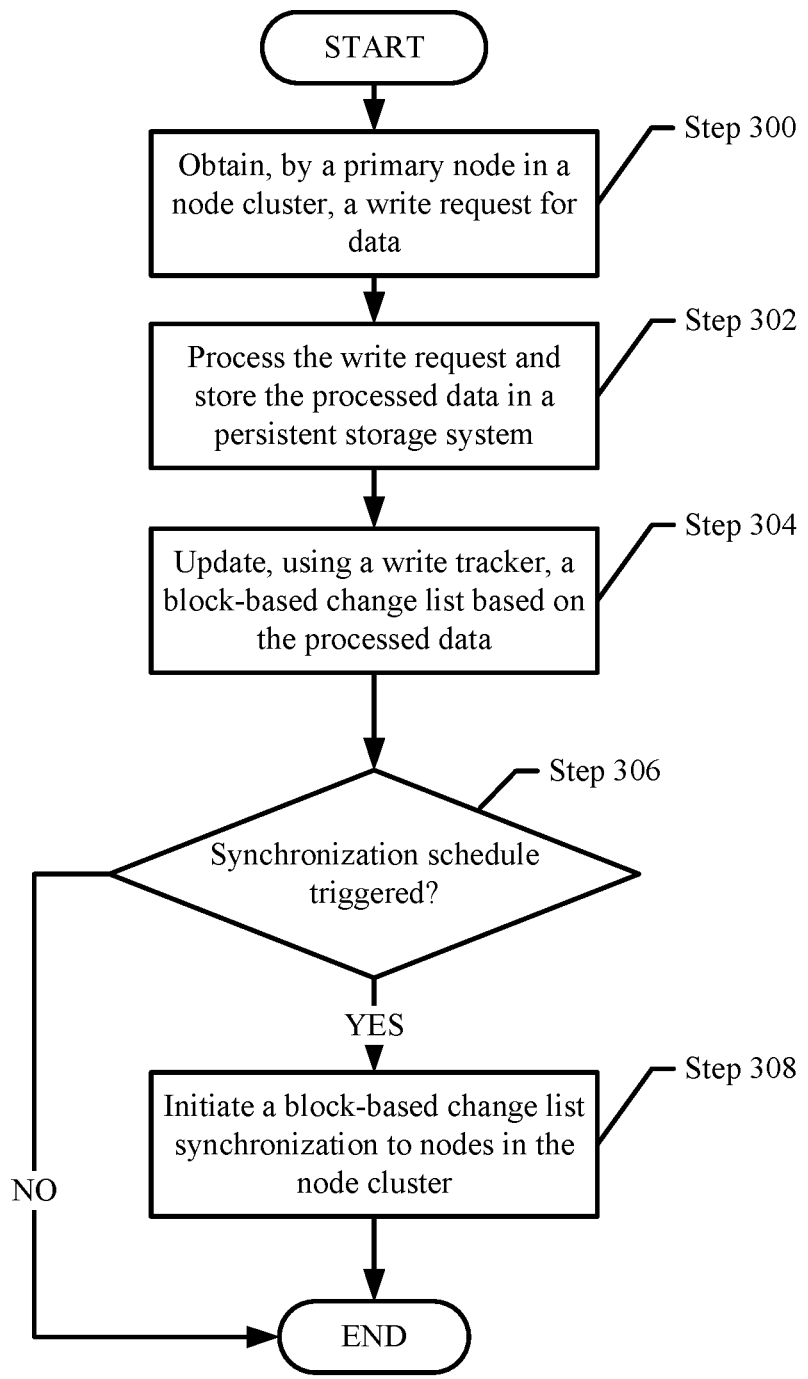
FIG. 3A shows a flowchart for maintaining a block-based change list in accordance with one or more embodiments of the invention.
Figure 3B:
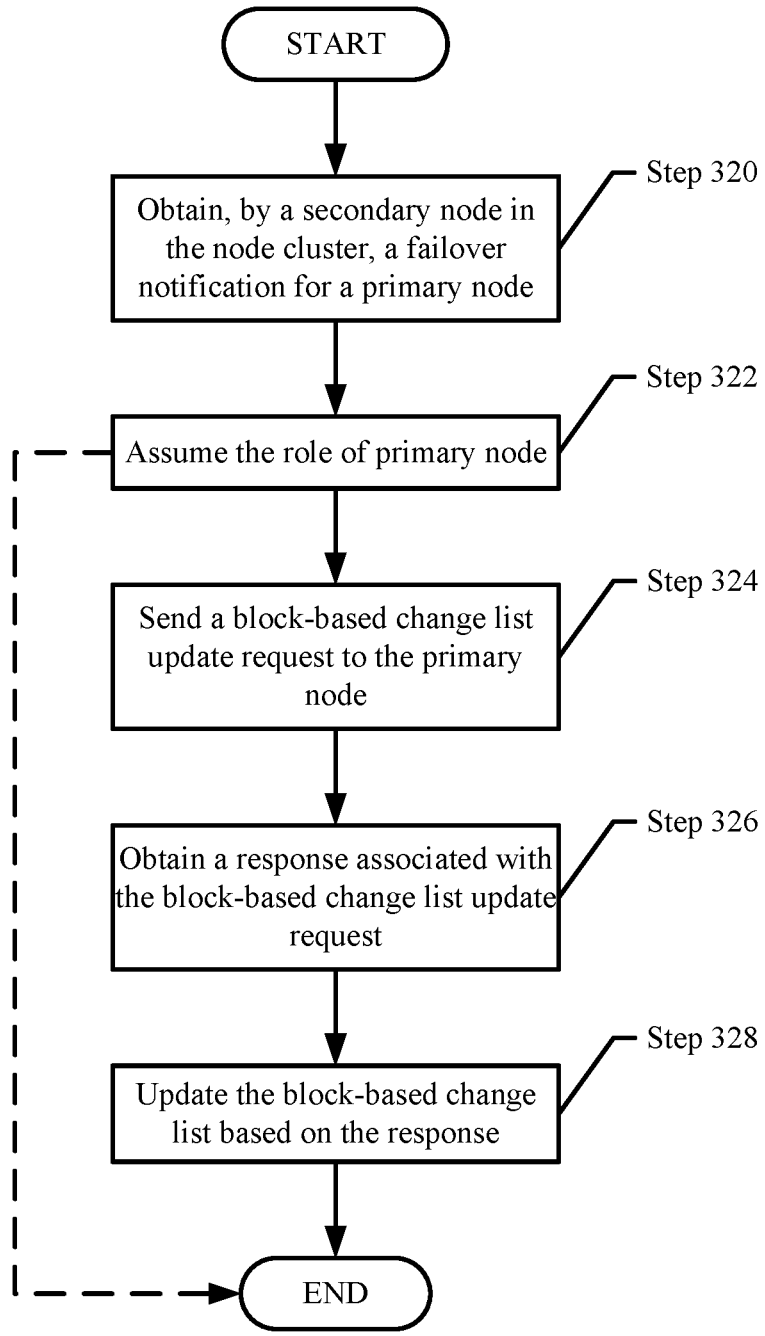
FIG. 3B shows a flowchart for managing a node failover in accordance with one or more embodiments of the invention.
Figure 3C:
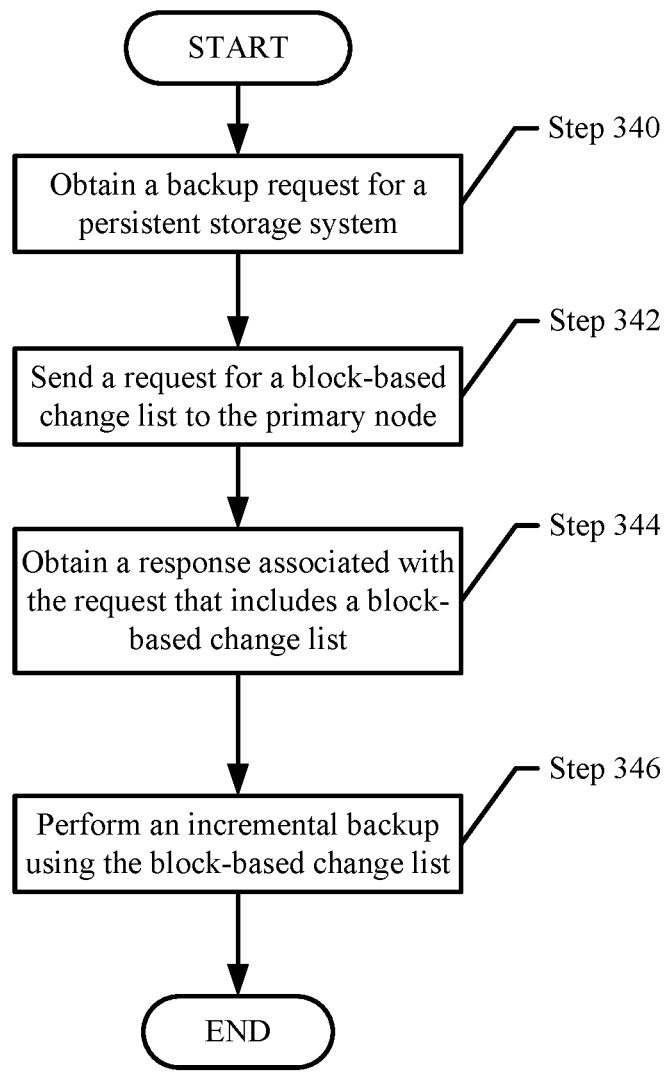
FIG. 3C shows a flowchart for initiating an incremental backup in accordance with one or more embodiments of the invention.

FIGS. 3A-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 3A shows a flowchart for maintaining a block-based change list in accordance with one or more embodiments of the invention. The method shown in FIG. 3A may be performed by, for example, a node (112A, 112N, FIG. 1) that assumed the role of primary node. Other components of the system illustrated in FIG. 1 may perform the method of FIG. 3A without departing from the invention.

In step 300, a write request for data is obtained. The write request may be obtained from a client. The write request may specify writing the data to the persistent storage system.

In step 302, the write request is processed and stored in the persistent storage system. In one or more embodiments of the invention, the write request is processed by writing the data to one or more portions of the persistent storage system.

For example, if the persistent storage system includes a disk drive, and each portion of the disk drive is a sector, the data may be written to all or a portion of a disk sector in the disk drive. Further, the data may be written to more than one disk sector.

In step 304, a block-based change list is updated based on the processed data. In one or more embodiments of the invention, the block-based change list is updated by determining the portion(s) (e.g., disk sectors) of the persistent storage device to which the data was written and specifying such portions in the block-based change list. In this manner, the block-based change list specifies the portions of the persistent storage system that have been modified since the most recent backup.

In step 306, a determination is made about whether a synchronization schedule is triggered. As discussed above, the synchronization trigger specifies when to initiate a synchronization of the block-based change list. If the synchronization trigger is scheduled, the method proceeds to step 308; otherwise, the method ends following step 306.

FIG. 3B shows a flowchart for managing a node failover in accordance with one or more embodiments of the invention. The method shown in FIG. 3B may be performed by, for example, a node (112A, 112N, FIG. 1). Other components of the system illustrated in FIG. 1 may perform the method of FIG. 3B without departing from the invention.

In step 320, a failover notification is obtained from a primary node. In one or more embodiments of the invention, the failover notification is obtained from the primary node. The primary node may detect an imminent failover (e.g., an unprompted reboot) and send the failover notification to the node performing the method of FIG. 3B in response to the detected failover. Alternatively, the failover notification may be the result of a periodic check-in performed by the node to determine whether the primary node has experienced a failover. A lack of response by the primary node may result in the failover notification.

In one or more embodiments of the invention, the failover notification is obtained from a client. The client may send the failover notification based on a determination that the primary node is not performing the tasks of the primary node.

In step 322, the role of primary node is assumed by the node. In one or more embodiments of the invention, the role of the primary node is determined based on predetermined policies implemented by each node in the node cluster for determining which node to assume the role of primary node should the current primary node experience a failover. The predetermined policies may include, for example, a list of hierarchical order for which node is to next assume the role of the primary node. Other predetermined policies may be implemented by the nodes to determine which node to assume the role of the primary node without departing from the invention.

In step 324, a block-based change list update request is sent to the primary node. In one or more embodiments of the invention, the block-based change list update request specifies requesting the primary node, if available and connected to the node, to send the block-based change list of the primary node to the node performing the method of FIG. 3B.

In step 326, a response associated with the block-based change list update request is obtained. The response may include the block-based change list of the primary node, which may be more up-to-date than the block-based change list of the node performing the method of FIG. 3B.

In step 328, the block-based change list is updated based on the response. In one or more embodiments of the invention, the block-based change list of the node performing the method of FIG. 3B is updated to reflect the portions of the persistent storage system that have been written as specified in the obtained block-based change list from step 326.

In one or more embodiments of the invention, if the primary node is not connected to the node performing the method of FIG. 3B (or otherwise not available), then steps 324-328 are not performed.

FIG. 3C shows a flowchart for initiating an incremental backup in accordance with one or more embodiments of the invention. The method shown in FIG. 3C may be performed by, for example, a backup agent (116, FIG. 1). Other components of the system illustrated in FIG. 1 may perform the method of FIG. 3C without departing from the invention.

In step 340, a backup request is obtained for a persistent storage system. The backup request may be obtained from a client managing the initiation of backups. Alternatively, the backup request may be the result of the backup agent implementing backup policies. As discussed above, the backup policies may include schedules that specify when to perform a backup of the persistent storage device.

In one or more embodiments of the invention, the backup request specifies performing an incremental backup. As discussed above, the incremental backup may be a backup that only includes data written after a most recent backup.

The most recent backup may be a full backup or another incremental backup without departing from the invention.

In step 342, a request for a block-based change list is sent to the primary node. In one or more embodiments of the invention, the request specifies obtaining the most up-to-date version of the block-based change list from the primary node.

In one or more embodiments of the invention, the backup agent sends the request to any node in the node cluster regardless of whether the node is a primary node. The node receiving the request may identify the primary node in the node cluster and forward the request to the primary node. The primary node may be identified via, e.g., a data structure that specifies the primary node.

In step 344, a response associated with the request is obtained that includes the block-based change list. In one or more embodiments of the invention, the response is sent by the primary node obtaining the request.

In step 346, an incremental backup is performed using the block-based change list. In one or more embodiments of the invention, the incremental backup is performed by generating a backup of the portions of the persistent storage device that are specified in the block-based change list to have been modified. The backup agent may generate a copy of blocks stored in the specified sections, and collectively store the copies of the blocks in an incremental backup. The incremental backup, after generation is complete, may be sent to the backup storage system to be stored.

In one or more embodiments of the invention, after the completion of the incremental backup, the backup agent may notify the primary node of the successful incremental backup. The notification may result in the block-based change list to be cleared of all specified portions. In this manner, after a second incremental backup is initiated, the block-based change list only specifies the portions of the persistent storage system that have been changed after the incremental backup of FIG. 3C is complete.

Example

Figure 4A:
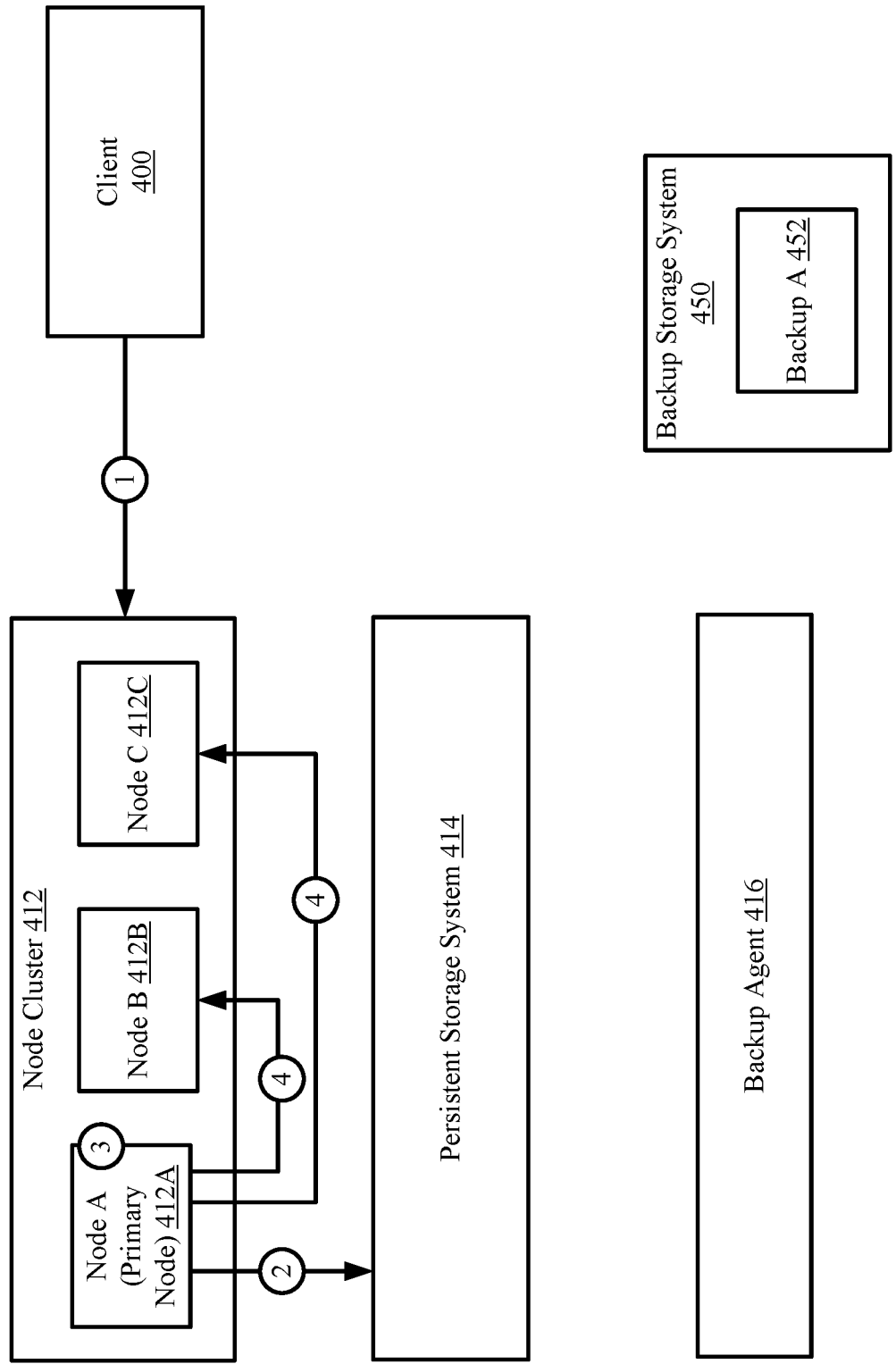
FIGS. 4A-4C show an example in accordance with one or more embodiments of the invention.
Figure 4B:
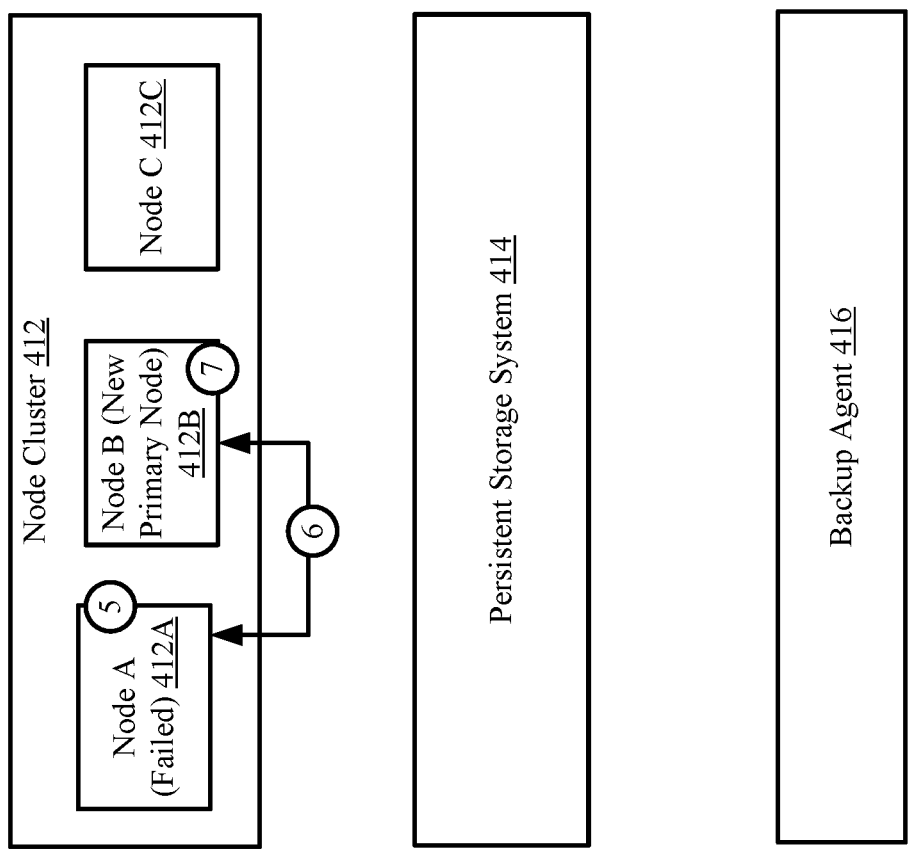
Figure 4C:
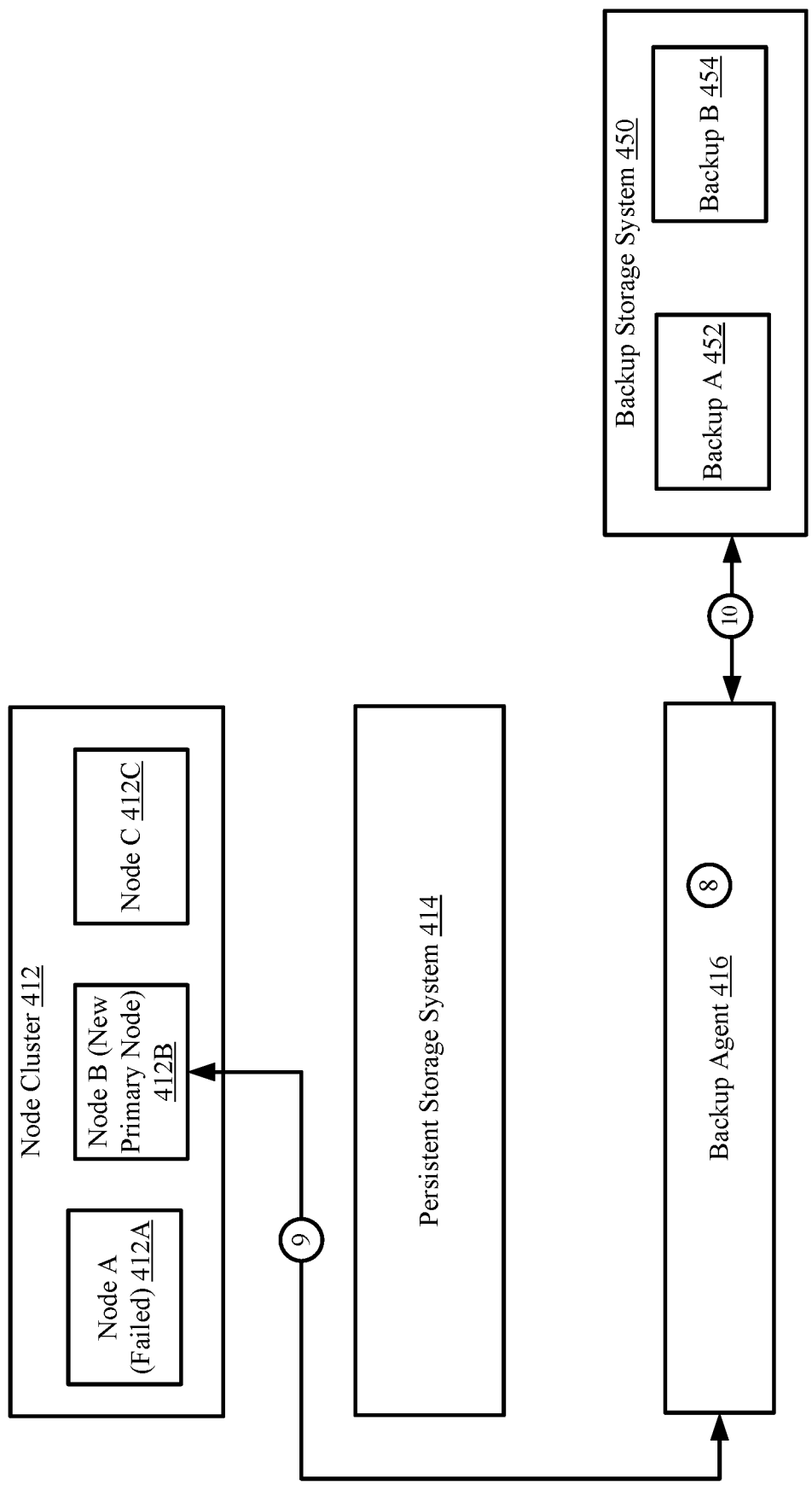

The following section describes an example. The example, illustrated in FIGS. 4A-4C, is not intended to limit the invention. Turning to the example, consider a scenario in which a system stores data in a persistent storage system shared by a node cluster.

FIG. 4A shows a first diagram of the example system. For the sake of brevity, not all components of the example system are illustrated in FIG. 4A. The example system includes a node cluster (412), a persistent storage system (414), a backup agent (416), a client (400), and a backup storage system (450).

After a full backup (i.e., backup A (452)) of the persistent storage system (414) has been generated and stored in the backup storage system (450), the client (400) sends a write request to the node cluster (412) for data to be processed [1]. The primary node of the node cluster (i.e., node A (412A)) processes the write request by writing data to the persistent storage system (414) [2]. Specifically, sections 1, 2, and 5 (not shown) of the persistent storage system (414) store the written data. After the write request is processed, node A (412A) updates a local block-based change list (not shown) of node A (412A) [3].

Further, node A (412A) determines that a synchronization schedule is triggered. The result of such determination is node A (412A) sending an update to the other nodes (i.e., node B (412B) and node C (412C)) in the node cluster [4]. In this manner, all three nodes (e.g., 412A, 412B, 412C) specify the changes to the persistent storage system (414) after the most recent backup.

FIG. 4B shows a second diagram of the example system. For the sake of brevity, not all components of the example system are illustrated in FIG. 4B. At a later point in time, node A (412A) experiences an imminent failure due to overload of CPU [5]. Node B (412B) obtains a failover notification that specifies the potential failover. In response, node B (412B) assumes the role of the new primary node. Further, node B (412B) communicates with node A (412A) to obtain an update to the local block-based change list of node B (412B). Node A (412A) sends a response to node B that includes the updated block-based change list [6]. Node B (412B) stores the updated block-based change list in memory [7].

FIG. 4C shows a third diagram of the example system. For the sake of brevity, not all components of the example system are illustrated in FIG. 4C. At a later point in time, a backup operation is triggered by the backup agent (416) implementing a backup policy [8]. The backup policy specifies performing an incremental backup of the persistent storage system (414). In response to the backup policy, the backup agent (416) communicates with the new primary node (i.e., node B (412B)) to obtain the block-based change list to be used for the incremental backup [9]. The backup agent (416) uses the block-based change list to generate the incremental backup. The incremental backup includes the data stored in sections 1, 2, and 5 (not shown) of the persistent storage system (414). The incremental backup is transferred to the backup storage system (450) and stored as backup B (454) [10].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing a backup operation of a node cluster in which a persistent storage system is shared among nodes in the node cluster. Because the role of primary node is constantly changing in a node cluster environment, current implementations of the node cluster environment may settle with only generating full backups of the data of a node cluster due to difficulty tracking what data has been written to in the persistent storage device. Embodiments of the invention enable the node cluster to track all changes made to the persistent storage device and enable the backup agent to utilize the tracked changes in order to generate the incremental backups.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a persistent storage system, the method comprising:
    obtaining, by a first node in a node cluster, a write request, wherein the node cluster comprises the first node and a second node;
    processing the write request;
    storing data associated with the write request in a persistent storage system;
    updating a block-based change list based on the storing;
    making a first determination that a synchronization schedule is triggered;
    in response to the first determination: initiating a block-based change list synchronization to the second node;
    after updating the block-based change list, obtaining a request from a backup agent for the block-based change list; and
    in response to the request, sending a second copy of the block-based change list to the backup agent.

2. The method of claim 1,
    wherein the data is stored in a first portion of the persistent storage system, and
    wherein the block-based change list specifies the first portion of the persistent storage system.

3. The method of claim 1, wherein initiating the block-based change list synchronization comprises:
    generating at least a copy of the block-based change list; and
    sending the copy of the block-based change list to the second node.

4. The method of claim 1, wherein the block-based change list is used to generate an incremental backup of the persistent storage system.

5. The method of claim 1, wherein the first node assumes a role of primary node.

6. The method of claim 5, further comprising:
    identifying an imminent failover of the first node; and
    in response to the imminent failover, sending a failover notification to the second node, wherein the failover notification specifies the second node assuming the role of primary node.

7. A system, comprising:
    a processor; and
    memory comprising instructions which, when executed by the processor, perform a method, the method comprising:
    obtaining, by a first node in a node cluster, a write request, wherein the node cluster comprises the first node and a second node;
    processing the write request;
    storing data associated with the write request in a persistent storage system;
    updating a block-based change list based on the storing;
    making a first determination that a synchronization schedule is triggered; and
    in response to the first determination: initiating a block-based change list synchronization to the second node;
    after updating the block-based change list, obtaining a request from a backup agent for the block-based change list; and
    in response to the request, sending a second copy of the block-based change list to the backup agent.

8. The system of claim 7,
    wherein the data is stored in a first portion of the persistent storage system, and wherein the block-based change list specifies the first portion of the persistent storage system.

9. The system of claim 7, wherein initiating the block-based change list synchronization comprises:
    generating at least a copy of the block-based change list; and
    sending the copy of the block-based change list to the second node.

10. The system of claim 7, wherein the block-based change list is used to generate an incremental backup of the persistent storage system.

11. The system of claim 7, wherein the first node assumes a role of primary node.

12. The system of claim 11, the method further comprising:
    identifying an imminent failover of the first node; and
    in response to the imminent failover, sending a failover notification to the second node, wherein the failover notification specifies the second node assuming the role of primary node.

13. A non-transitory computer readable medium comprising computer readable program code, which when executed by a computer processor enables the computer processor to perform a method for performing a backup operation, the method comprising:

obtaining, by a first node in a node cluster, a write request, wherein the node cluster comprises the first node and a second node;
processing the write request;
storing data associated with the write request in a persistent storage system;
updating a block-based change list based on the storing;
making a first determination that a synchronization schedule is triggered; and
in response to the first determination: initiating a block-based change list synchronization to the second node;
after updating the block-based change list, obtaining a request from a backup agent for the block-based change list; and
in response to the request, sending a second copy of the block-based change list to the backup agent.

14. The non-transitory computer readable medium of claim 13,
wherein the data is stored in a first portion of the persistent storage system, and
wherein the block-based change list specifies the first portion of the persistent storage system.

15. The non-transitory computer readable medium of claim 13, wherein initiating the block-based change list synchronization comprises:
generating at least a copy of the block-based change list; and
sending the copy of the block-based change list to the second node.

16. The non-transitory computer readable medium of claim 13, wherein the block-based change list is used to generate an incremental backup of the persistent storage system.

17. The non-transitory computer readable medium of claim 13, the method further comprising:
identifying an imminent failover of the first node; and
in response to the imminent failover, sending a failover notification to the second node, wherein the failover notification specifies the second node assuming a role of primary node.

* * * * *